United States Patent
Holzer et al.

(10) Patent No.: US 8,712,658 B2
(45) Date of Patent: Apr. 29, 2014

(54) METHOD FOR ADAPTING A CONTACT POINT OF A CLUTCH IN A DRIVETRAIN OF A MOTOR VEHICLE

(71) Applicant: Schaeffler Technologies AG & Co. KG, Herzogenaurach (DE)

(72) Inventors: Lukas Holzer, Sasbach (DE); Juergen Eich, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/660,355

(22) Filed: Oct. 25, 2012

(65) Prior Publication Data

US 2013/0066530 A1    Mar. 14, 2013

Related U.S. Application Data

(63) Continuation of application No. PCT/DE2011/000411, filed on Apr. 14, 2011.

(30) Foreign Application Priority Data

Apr. 26, 2010  (DE) .......................... 10 2010 018 190
Jul. 8, 2010  (DE) .......................... 10 2010 026 540

(51) Int. Cl.
  *G06F 7/00*  (2006.01)
  *G06F 17/00*  (2006.01)
  *G06F 19/00*  (2011.01)

(52) U.S. Cl.
  USPC ............................................... 701/68

(58) Field of Classification Search
  USPC .................................... 701/67, 68
  See application file for complete search history.

(56) References Cited

U.S. PATENT DOCUMENTS

| | | | |
|---|---|---|---|
| 5,989,153 A * | 11/1999 | Fischer et al. | 477/74 |
| 5,993,352 A * | 11/1999 | Kosik et al. | 477/74 |
| 6,001,044 A * | 12/1999 | Amendt | 477/180 |
| 6,015,031 A * | 1/2000 | Dorfschmid et al. | 192/3.58 |
| 6,602,161 B2 * | 8/2003 | Hemmingsen et al. | 477/79 |
| 6,966,868 B2 * | 11/2005 | Stork et al. | 477/74 |
| 7,032,733 B2 * | 4/2006 | Parigger | 192/84.6 |

(Continued)

FOREIGN PATENT DOCUMENTS

| | | |
|---|---|---|
| DE | 102005030185 | 2/2006 |
| DE | 102007015679 | 10/2008 |

(Continued)

*Primary Examiner* — Khoi Tran
*Assistant Examiner* — Nicholas Kiswanto
(74) *Attorney, Agent, or Firm* — Simpson & Simpson, PLLC

(57) ABSTRACT

A method for adapting a contact point of a clutch in a drivetrain of a motor vehicle, wherein the clutch is moved by an actuator and the influence of the movement of the clutch on a rotating electric motor is evaluated. A method that is simple and quick to carry out, a clutch torque and/or an actuator path close to the contact point is obtained from a characteristic curve of the clutch representing the relationship of an actuator path to a clutch torque and is set at the clutch. Subsequently the associated actuator path and/or the clutch torque is measured from the clutch influenced by the actively operated electric motor, where the clutch torque read from the characteristic curve and the actuator path measured at the clutch and/or the actuator path obtained from the characteristic curve and the measured clutch torque form the current contact point position of the clutch.

7 Claims, 2 Drawing Sheets

(56) References Cited

U.S. PATENT DOCUMENTS

| | | | |
|---|---|---|---|
| 7,158,873 B2 * | 1/2007 | Eich et al. | 701/68 |
| 7,424,356 B2 * | 9/2008 | Jung et al. | 701/67 |
| 7,522,984 B2 * | 4/2009 | Karrelmeyer et al. | 701/67 |
| 7,717,248 B2 * | 5/2010 | Reuschel | 192/54.4 |
| 7,972,235 B2 * | 7/2011 | Usoro et al. | 475/5 |
| 8,105,205 B2 * | 1/2012 | Reuschel | 477/181 |
| 8,229,638 B2 * | 7/2012 | Biancale et al. | 701/67 |
| 2003/0144110 A1 * | 7/2003 | Jung et al. | 477/80 |
| 2004/0238311 A1 * | 12/2004 | Parigger | 192/84.6 |
| 2006/0009328 A1 * | 1/2006 | Jung et al. | 477/176 |
| 2006/0154781 A1 * | 7/2006 | Petzold et al. | 477/80 |
| 2007/0061060 A1 * | 3/2007 | Karrelmeyer et al. | 701/67 |
| 2007/0199790 A1 * | 8/2007 | Whitmer et al. | 192/70.252 |
| 2009/0000901 A1 * | 1/2009 | Reibold | 192/70.252 |
| 2010/0113218 A1 | 5/2010 | Herter et al. | |
| 2010/0282561 A1 * | 11/2010 | Rinck et al. | 192/48.3 |

FOREIGN PATENT DOCUMENTS

| | | |
|---|---|---|
| DE | 102008030473 | 1/2009 |
| DE | 102008014531 | 9/2009 |
| EP | 1510717 | 3/2005 |

\* cited by examiner

METHOD FOR ADAPTING A CONTACT POINT OF A CLUTCH IN A DRIVETRAIN OF A MOTOR VEHICLE

CROSS-REFERENCE TO RELATED APPLICATIONS

This application is filed under 35 U.S.C. §120 and §365(c) as a continuation of International Patent Application No. PCT/DE2011/000411 flied Apr. 14, 2011 and claiming priority of German Patent Application No. 10 2010 018 190.0 filed Apr. 26, 2010 and German Patent Application No. 10 2010 026 540.3 filed Jul. 8, 2010, which applications are incorporated herein by reference to their entireties.

FIELD OF THE INVENTION

The invention relates to a method for adapting a contact point of a clutch in a drivetrain of a motor vehicle, wherein the clutch is moved by an actuator and the influence of the movement of the clutch on a rotating electric motor is evaluated.

In the case of clutch and dual clutch systems controlled by means of software, the engine torque to be transmitted by the clutch is set with the help of an actuator. The actuator path to be set is obtained from the clutch characteristic curve, which describes the clutch torque as a function of the actuator path. This clutch characteristic curve changes both in the short term, for example, due to temperature influence, as well as over the long term, for example, due to wear on the clutch plates. The clutch characteristic curve itself is adapted to the real behavior of a clutch by at least two parameters, the contact point and the coefficient of friction. The contact point represents that actuator position at which the clutch just begins to transmit torque. In practice, the contact point is indicated by a small clutch torque of, for example, 5 Nm.

BACKGROUND OF THE INVENTION

From DE 10 2008 030 473 A1 a method for obtaining the contact point of an automated clutch is known, in which the contact point of the clutch is determined with the combustion engine shut off, in that the clutch is slowly engaged and the influence of the engaging clutch on an electric machine that is rotating at a prescribed speed is evaluated. At the same time, various control points of the clutch characteristic curve are recorded. On the clutch, a target clutch torque over time is set, and a signal response obtained from the electric machine and assigned to the target clutch torque is evaluated. At the same time, the target clutch torque is modulated to improve the evaluation of the signal response of the electric machine. In order to detect the contact point, the clutch characteristic curve is completely recorded, the contact point being determined from the difference between the target clutch torque and the response signal of the electric machine or the ratio of these two signals to each other. This is a very complex determination of the contact point.

BRIEF SUMMARY OF THE INVENTION

The invention is thus based on the object of specifying a method for adapting a contact point of a clutch, which can be obtained simply and reliably.

According to the invention, the object is fulfilled by obtaining, close to the contact point, a clutch torque and/or an actuator path which is set at the clutch from a characteristic curve of the clutch which represents the ratio of an actuator path to a clutch torque, and then measuring the respective corresponding actuator path or the corresponding clutch torque from the clutch influenced by the actively operated electric motor, where the clutch torque read from the characteristic curve and the actuator path measured at the clutch and/or the actuator path taken from the characteristic curve and the measured clutch torque form the current contact point position of the clutch. As, in each case, only one parameter needs to be obtained, either the actuator position or the clutch torque, the contact point position can be detected especially quickly.

Advantageously, a constant speed is set at the electric motor, and the clutch is changed by the actuator from a disengaged position in the direction of closure, until the torque of the electric motor exhibits a value that corresponds approximately to a clutch torque obtained from the characteristic curve, at which the actuator path traversed by the actuator is measured. Once the actuator path has been determined, by comparing it with the clutch characteristic curve, it is sufficient to ascertain an exact contact point position.

In one embodiment, instead of the absolute torque, a torque difference at the electric motor is evaluated.

The contact point can be obtained especially advantageously if the measured actuator path in the characteristic curve corresponds to a path offset by which the actual characteristic curve of the clutch deviates from the clutch characteristic curve. This is an especially simple method of obtaining the actual clutch characteristic curve.

In one variant, the actuator will move the clutch by an actuator path obtained from the characteristic curve, to which a small clutch torque is assigned in the characteristic curve, where the torque of the electric motor is increased in the direction of the clutch torque, and when a slipping state of the clutch is reached, the torque of the electric motor is measured which corresponds in the characteristic curve to the obtained actuator path, and the current contact point position of the clutch is formed therefrom. Here too, the determination of only a single clutch torque is sufficient to thereby shift the original clutch characteristic curve in such a way that it corresponds to the actual characteristic curve of the clutch being tested.

Furthermore, the measured torque of the electric motor in the clutch characteristic curve corresponds to a torque offset by which the actual characteristic curve of the clutch deviates from the original clutch characteristic curve.

In a refinement, the clutch is designed as a dual clutch system, where the first clutch influences the rotary movement of the electric motor via a first transmission input shaft; when the brake is operated a gear is engaged in a gear set that connects the second clutch to an output shaft, and the second clutch is completely engaged. Through this procedure, in particular in a hybrid vehicle, in which there is a combustion engine in the drivetrain, the first transmission input shaft is locked on the side of the combustion engine by means of the output shaft, which reliably prevents a tow-starting of the combustion engine.

Advantageously, the motor vehicle does not execute any driving motion, and a first transmission input shaft connected to the first clutch, which connects the first clutch to the electric motor through a gear set, is situated in a neutral position of the transmission, where, in particular, the motor vehicle designed as a hybrid vehicle is in a stationary driving situation. Such a procedure is of particular importance specifically for hybrid vehicles, since hybrid vehicles frequently exhibit a start/stop strategy, in which the combustion engine is shut off when the vehicle is stopped. Accordingly, the contact point adaptation can be carried out simply by means of an electric motor in situations in which the vehicle is standing still.

In one variant, the motor vehicle is designed as a hybrid vehicle having a combustion engine and an electric motor, the combustion engine being deactivated. Since the hybrid vehicle is propelled exclusively by the electric motor, and the combustion engine makes no contribution to the driving operation of the motor vehicle, the contact point adaptation can be carried out even during stationary driving operation, since the clutch is connected only to the electric motor.

Advantageously, the clutch torque is less than a tow-starting torque of the combustion engine. This has the advantage that even if the clutch torque is unintentionally transmitted to the combustion engine, there is assurance that the combustion engine is not also rotated, or even tow-started.

In a refinement, a gear is selected in the dual clutch transmission, while a torque is transmitted from the electric motor to the second clutch, a first clutch being completely disengaged. Such a procedure also enables the position of the contact point to be detected especially simply and quickly.

The invention allows numerous embodiments. One of these will be explained in greater detail on the basis of the figure depicted in the drawing.

DETAILED DESCRIPTION OF THE INVENTION

Figure 1:
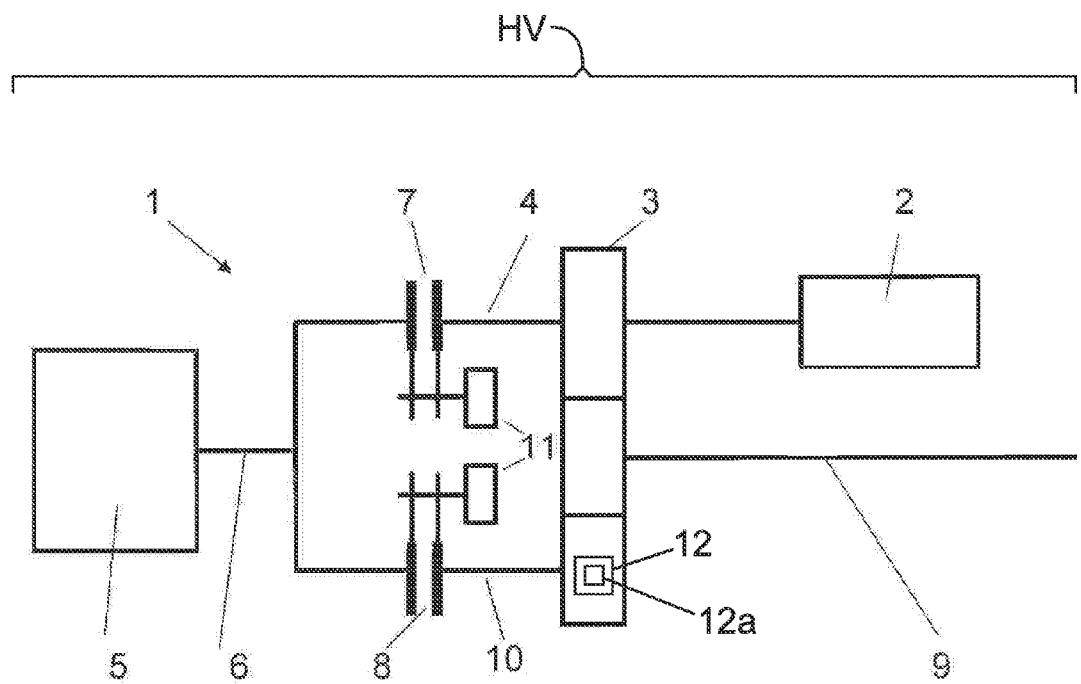
FIG. 1 is a schematic construction of a dual clutch transmission of a hybrid vehicle.

FIG. 1 depicts a drivetrain 1 of hybrid motor vehicle HV having a dual clutch transmission. An electric motor 2 is attached via a transmission 3 to a first transmission input shaft 4, which leads to a first clutch 7. A combustion engine 5 is connected to the first clutch 7 through a combustion engine output shaft 6. In addition, the dual clutch transmission has a second clutch 8, which is connected on one hand to an output shaft 9 and on the other hand to the combustion engine output shaft 6. Two actuators 11 move clutches 7 and 8 respectively. Clutch 8 is connected to output shaft 9 via transmission shaft 10. Transmission 3 includes gear set 12 and gear 12a.

Figure 2:
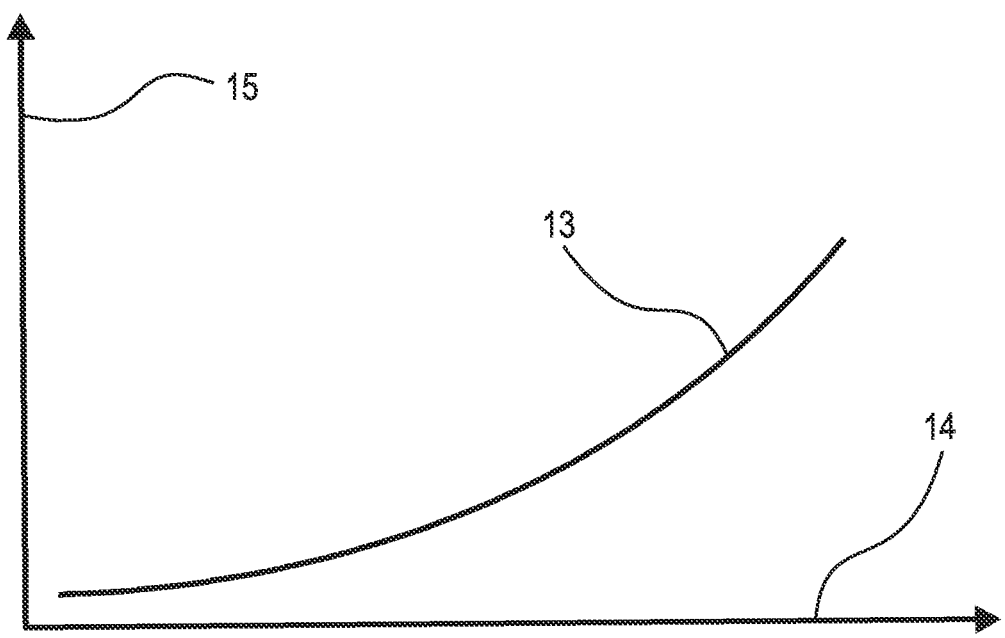
FIG. 2 is an ordinary clutch characteristic curve.

FIG. 2 depicts an ordinary clutch characteristic curve 13. The horizontal axis is the actuator path 14. The vertical axis is clutch torque 15.

In the other considerations, it is assumed that the torque of the electric motor 2 is known with sufficient precision.

With such dual clutch transmissions there are various possibilities of adapting a reference clutch characteristic curve, which depicts the connection between the clutch torque and the actuator path, in the vicinity of a contact point, with the aid of the electric motor 2. The contact point of the clutch is understood as the actuator position at which the clutch is just able to transmit torque. The contact point torque is defined, for example, as 5 Nm.

In a first situation it is assumed that the vehicle is standing still and that the combustion engine 5 is shut off. The first transmission input shaft 4 has assumed a neutral position in the transmission 3, so that no transfer is engaged between the shafts brought together in transmission 3. In a first step, with the clutches completely disengaged, a constant speed is set at electric motor 2. After the target rotational speed has been reached, a reference torque can be obtained from the electric motor torque signal and saved. Next, in a further step, the disengaged first clutch 7 is moved in an engaging direction. This continues until a deviation from the previously obtained reference torque appears in the continuously measured torque of the electric motor 2, which corresponds to an amount which was obtained from the reference torque characteristic before the beginning of the measurement. Now the actuator path, which the actuator traversed when the first clutch 7 was moved from the disengaged state until the predefined amount of the clutch torque was reached, is determined. The actuator path determined in this way is assigned in the reference clutch characteristic curve to the previously selected reference clutch torque, whereby the actual contact point of the clutch is obtained. Alternatively, the clutch can be engaged until an actuator position obtained previously from the characteristic curve is reached. The torque measured at the electric motor 2 can be assigned to the previously selected reference actuator path in the clutch characteristic curve. The clutch characteristic curve thus shifts in its entirety, while the shape of the characteristic curve is preserved.

In a second situation it is likewise assumed that the vehicle is standing still, the combustion engine 5 is shut off, and the transmission input shaft 4 has been set in a neutral position. In a first step, with electric motor 2 deactivated, any desired reference clutch torque in the vicinity of the reference contact point is first selected on the basis of the reference clutch characteristic curve. Next, in a second step, the reference actuator path belonging to the selected reference clutch torque is set at the clutch 7. Only now is the electric motor 2 activated and the torque of the electric motor 2 slowly increased, until the first clutch 7 slips. If the clutch 7 begins to slip, a rotation is detected in the first transmission input shaft 4. If this is the case, the torque of the electric motor 2 is measured. Since the reference torque read from the reference clutch characteristic curve corresponds to a particular reference actuator position, the clutch torque now obtained through the measurement is assigned to this reference actuator position. The point that is formed from the measured clutch torque and the reference actuator path read from the reference clutch characteristic curve represents the current contact point of the clutch. The clutch characteristic curve corresponds to the reference clutch characteristic curve, shifted by the measured clutch torque.

With both named exemplary embodiments, it must be ensured that the clutch torque is always small enough so that a tow-starting torque of the combustion engine 5 is not exceeded, in order to reliably prevent a rotary movement of the combustion engine 5.

With the explained dual clutch transmission it is advantageous if, with the wheels standing still—which is the case in particular upon operation of a brake (not depicted in further detail)—, a second transmission input shaft 10, which connects the second clutch 8 to the transmission 3, has a gear selected. Next, the second clutch 8 is completely engaged. As a result, the first clutch 7 is locked on the engine side by means of the output shaft 9, reliably preventing tow-starting of the combustion engine 5.

An adaptation of the characteristic curve of clutch 8 can be accomplished in an analogous manner by a gear being selected in transmission 3, so that torque is transmitted to the clutch 8 from the electric motor 2. In this case, however, the clutch 7 must be completely disengaged and hence must not transmit any torque.

In the case of hybrid vehicles which are in a pure electric motor mode, however, the contact point adaptation is also possible in a stationary driving mode. A stationary driving mode is understood in this case to mean that a constant pedal value is set, a constant vehicle velocity has been reached, and an unchanging torque is present at the electric motor 2. From the reference clutch curve a reference clutch torque is selected, for example, 5 Nm. The torque of electric motor 2 is then changed until this reference clutch torque is reached. Since this reference clutch torque, as read from the reference clutch characteristic curve, is assigned in turn to an actuator path, the actuator path which the actuator traverses when the clutch is moved from a disengaged state in an engaged direction, is measured until the reference clutch torque is reached. The reference clutch torque read from the reference clutch characteristic curve is assigned to the measured actuator path. A characteristic curve adapted in the environment of the actual contact point of the clutch 7 is thus attained. In contrast to the first situation portrayed at the beginning, the only thing that changes in the stationary driving mode is that the load exerted on the motor vehicle is shifted, since the torque of the electric motor 2 must be increased in order to maintain the rotational speed once it has been set.

REFERENCE NUMERALS 1 drivetrain
2 electric motor
3 transmission
4 first transmission input shaft
5 combustion engine
6 combustion engine output shaft
7 first clutch
8 second clutch
9 output shaft
10 second transmission input shaft

What is claimed is:

1. A method for adapting a contact point in a drivetrain of a motor vehicle including a dual clutch transmission with a first clutch connected to a first input shaft for the transmission and a second clutch connected to a second input shaft for the transmission, a combustion engine, and an electric motor connected to the first input shaft via the dual clutch transmission, comprising:
    placing the first and second clutch in a disengaged first position, for the first transmission input shaft, the transmission is in a neutral position to the transmission output shaft;
    rotating the electric motor;
    obtaining and saving a first reference torque of the electric motor;
    moving, using an actuator, the first clutch in an engagement direction to a second position;
    measuring the torque of the electric motor;
    determining that the measured torque of the electric motor is approximately equal to a predetermined clutch torque from a characteristic curve for the first clutch;
    determining a path traversed by the actuator from the disengaged first position of the first clutch to the second position of the first clutch; and,
    replacing, in the characteristic curve, a reference actuator path for the predetermined clutch torque with the path traversed by the actuator.

2. The method recited in claim 1, wherein, when a brake is operated, the second input shaft of the transmission has a gear engaged in a gear set that connects the second clutch to the output shaft, the second clutch is completely engaged, and the first clutch is locked.

3. A method for adapting a contact point in a drivetrain of a motor vehicle including a dual clutch transmission with a first clutch connected to a first input shaft for the transmission and a second clutch connected to a second input shaft for the transmission, a combustion engine, and an electric motor connected to the first input shaft via the dual clutch transmission, comprising:
    placing the first and second clutch in a disengaged first position for the first transmission input shaft the transmission is in a neutral position to the transmission output shaft;
    rotating the electric motor;
    displacing an actuator for the first clutch according to a reference actuator path from a characteristic curve for the first clutch;
    measuring the torque of the electric motor; and,
    replacing, in the characteristic curve, a reference torque associated with the reference actuator path with the measured torque of the electric motor.

4. The method recited in claim 3, wherein, when a brake is operated, the second input shaft of the transmission has a gear engaged in a gear set that connects the second clutch to the output shaft, the second clutch is completely engaged, and the first clutch is locked.

5. A method for adapting a contact point in a drivetrain of a motor vehicle including a dual clutch transmission with a first clutch connected to a first input shaft for the transmission and a second clutch connected to a second input shaft for the transmission, a combustion engine, and an electric motor connected to the first input shaft via the dual clutch transmission, comprising:
    placing the first and second clutch in a disengaged first position for the first transmission input shaft the transmission is in a neutral position to the transmission output shaft;
    deactivating the electric motor;
    selecting a reference clutch torque, in a vicinity of a reference contact point for the first clutch, from a characteristic curve for the first clutch;
    displacing an actuator for the first clutch according to a reference actuator path, from the characteristic curve, belonging to the selected reference clutch torque;
    activating the electric motor until the first clutch slips;
    measuring a torque of the electric motor; and,
    replacing the reference clutch torque in the characteristic curve with the measured torque of the electric motor.

6. The method recited in claim 5, wherein, when a brake is operated, the second input shaft of the transmission has a gear engaged in a gear set that connects the second clutch to the output shaft, the second clutch is completely engaged, and the first clutch is locked.

7. A method for adapting a contact point in a drivetrain of a motor vehicle including a dual clutch transmission with a first clutch connected to a first input shaft for the transmission, a second clutch connected to a second input shaft for the transmission, and an actuator for the first clutch, a combustion engine, and an electric motor connected to the first input shaft via the dual clutch transmission, comprising:
    propelling the motor vehicle at a constant velocity with the electric motor only;
    disengaging the first clutch;
    selecting a reference torque for the first clutch from a reference clutch curve;
    engaging, using the actuator, the first clutch;
    changing torque of the electric motor until the reference torque is reached for the first clutch;
    measuring a path traversed by the actuator to engage the first clutch and reach the reference torque; and,
    assigning the reference torque to the measured path of the actuator.

* * * * *